US012600888B2

(12) United States Patent
Tsuno et al.

(10) Patent No.: US 12,600,888 B2
(45) Date of Patent: Apr. 14, 2026

(54) DUAL-CURABLE ADHESIVE COMPOSITION

(71) Applicant: Henkel AG & Co. KGaA, Duesseldorf (DE)

(72) Inventors: Shingo Tsuno, Kanagawa (JP); Takayuki Kanno, Kanagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 624 days.

(21) Appl. No.: 17/951,798

(22) Filed: Sep. 23, 2022

(65) Prior Publication Data

US 2023/0027326 A1 Jan. 26, 2023

Related U.S. Application Data

(63) Continuation of application No. PCT/JP2021/011821, filed on Mar. 22, 2021.

(30) Foreign Application Priority Data

Mar. 23, 2020 (JP) ................................ 2020-051861

(51) Int. Cl.

| | |
|---|---|
| ***C08F 2/46*** | (2006.01) |
| ***C08F 2/50*** | (2006.01) |
| ***C08G 61/04*** | (2006.01) |
| ***C09J 163/00*** | (2006.01) |
| *C08K 3/36* | (2006.01) |
| *C08K 7/18* | (2006.01) |

(52) U.S. Cl.

CPC ............... *C09J 163/00* (2013.01); *C08K 3/36* (2013.01); *C08K 7/18* (2013.01)

(58) Field of Classification Search

CPC . C09J 163/00; C08K 5/06; C08K 7/18; C08K 3/36; C08L 63/00; H04N 23/50

USPC ....... 522/166, 162, 1, 6, 71, 189, 184; 520/1

See application file for complete search history.

(56) References Cited

U.S. PATENT DOCUMENTS

| | | | | |
|---|---|---|---|---|
| 6,498,200 | B1 † | 12/2002 | Suzuki | |
| 7,723,441 | B2 | 5/2010 | Shustack | |
| 8,304,470 | B2 | 11/2012 | Noro et al. | |
| 10,428,214 | B2 * | 10/2019 | Matsuoka | C08G 59/00 |
| 2007/0155850 | A1 † | 7/2007 | Shustack | |
| 2016/0289370 | A1 * | 10/2016 | Son | C08G 59/687 |
| 2020/0208019 | A1 | 7/2020 | Matsuoka | |
| 2020/0299458 | A1 | 9/2020 | Kameyama et al. | |
| 2021/0206916 | A1 † | 7/2021 | Kameyama | |

FOREIGN PATENT DOCUMENTS

| | | | | | |
|---|---|---|---|---|---|
| CN | 109963920 | A | | 7/2019 | |
| CN | 106459381 | B | * | 2/2020 | C08G 59/68 |
| EP | 2128183 | A1 | | 12/2009 | |
| JP | 2007204738 | A | | 8/2007 | |
| JP | 2009286928 | A | | 12/2009 | |
| JP | 2010229392 | A | | 10/2010 | |
| JP | 2015108060 | | | 6/2015 | |
| JP | 2016102170 | | | 6/2016 | |
| JP | 2016172813 | | | 9/2016 | |
| JP | 2017075205 | | | 4/2017 | |
| JP | 2018041079 | | | 3/2018 | |
| JP | 2018095591 | | | 6/2018 | |
| WO | 2015005211 | | | 1/2015 | |
| WO | WO-2015005211 | A1 | * | 1/2015 | C08G 59/20 |
| WO | 2017057637 | A1 | | 4/2017 | |
| WO | 2017094584 | A1 | | 6/2017 | |
| WO | WO-2017164238 | A1 | * | 9/2017 | C08G 59/42 |
| WO | 2018092463 | | | 5/2018 | |
| WO | 2019091764 | | | 5/2019 | |

OTHER PUBLICATIONS

Takahi et al., WO 2015/005211 Machine Translation, Jan. 15, 2015 (Year: 2015).*

Teng et al., CN 106459381 Machine Translation, Feb. 7, 2020 (Year: 2020).*

Kameyama et al, WO 2017164238 Machine Translation, Sep. 28, 2017 (Year: 2017).*

International Search Report issued in connection with International Patent Application No. PCT/JP2021/011821 mailed Jun. 15, 2021.

* cited by examiner
† cited by third party

*Primary Examiner* — Jessica Whiteley
(74) *Attorney, Agent, or Firm* — Steven C. Bauman

(57) ABSTRACT

The object of the present invention is to provide an adhesive composition that has a low toxicity, is curable at a low temperature, and is capable of forming a cured product having high heat resistance. The present invention relates to a dual-curable adhesive composition comprising: (a1) an oxetane compound, (a2) an alicyclic epoxy compound, (a3) an aromatic glycidyl ether-based epoxy compound, (b) a photocationic polymerization initiator, and (c) a thermal cationic polymerization initiator comprising a tetrakis(pentafluorophenyl)borate compound, wherein the amount of the component (a1) is 20 to 95 parts by mass, the amount of the component (a2) is 3 to 55 parts by mass, and the amount of the component (a3) is 3 to 45 parts by mass, each based on 100 parts by mass of the total amount of the components (a1), (a2) and (a3).

9 Claims, No Drawings

DUAL-CURABLE ADHESIVE COMPOSITION

TECHNICAL FIELD

The present invention relates to a dual-curable adhesive composition that is curable through cationic polymerization by light irradiation and heating, a cured product thereof, and a camera module using the dual-curable adhesive composition.

BACKGROUND ART

Camera modules mounted in cars, smartphones, and the like have a lens, a tubular lens holder for holding the lens, and an image capturing sensor fixed on a base plate for converting the light collected by the lens into an electrical signal. In an assembly of this camera module, it is necessary to firmly bond the lens holder and the base plate on which the image capturing sensor is fixed. An adhesive is used for this bonding (Patent Literature 1).

When bonding the lens holder and the base plate on which the image capturing sensor is fixed, it is necessary to accurately maintain the distance between the lens and the image capturing sensor. Specifically, it is necessary to match the distance between the lens and the light receiving surface of the image capturing sensor with the focal length of the lens. For this purpose, it has been proposed to use a UV/thermally curable adhesive (Patent Literature 2).

As the UV/thermally curable adhesive composition, a composition comprising an epoxy resin is known because such a composition has high adhesive strength and excellent mechanical strength, water resistance, and the like. On the other hand, a composition comprising an epoxy resin often needs to be cured at a high temperature of 150° C. or higher, and is not suitable for an application of bonding a member that is susceptible to heat. Therefore, there is a need to develop an adhesive composition that can be rapidly cured at a low temperature and can form a cured product having a high heat resistance.

As an adhesive that cures by both light and heat, for example, Patent Literature 3 proposes a cationically curable epoxy resin composition comprising an epoxy resin component, a photocationic initiator, a thermal cationic initiator, and a filler. In Examples and others of Patent Literature 3, antimony-containing compounds are used as the photocationic initiator and the thermal cationic initiator.

CITATION LIST

Patent Literature

PTL 1: Japanese Patent Laid-Open Publication No. 2007-184801

PTL 2: Japanese Patent Laid-Open Publication No. 2009-141406

PTL 3: WO 2005/059002

SUMMARY OF INVENTION

Technical Problem

It is known that when an antimony-containing compound is used as a thermal cationic polymerization initiator as in Patent Literature 3, curing can be achieved at a high curing rate and at a low temperature. However, antimony suffers from the problem that it is highly toxic and difficult to handle, and therefore there has been a need to develop an adhesive composition that is curable at a low temperature and can provide a cured product having high heat resistance without using an antimony-containing compound.

Therefore, an object of the present invention is to provide an adhesive composition having a low toxicity, curable at a low temperature, and capable of forming a cured product having high heat resistance.

Solution to Problem

The present invention and preferred embodiments of the present invention are as follows.

1. A dual-curable adhesive composition comprising:
   (a1) an oxetane compound,
   (a2) an alicyclic epoxy compound,
   (a3) an aromatic glycidyl ether-based epoxy compound,
   (b) a photocationic polymerization initiator, and
   (c) a thermal cationic polymerization initiator comprising a tetrakis(pentafluorophenyl)borate compound, wherein
   the amount of the component (a1) is 20 to 95 parts by mass,
   the amount of the component (a2) is 3 to 55 parts by mass, and
   the amount of the component (a3) is 3 to 45 parts by mass,
   each based on 100 parts by mass of the total amount of the components (a1), (a2) and (a3).
2. The dual-curable adhesive composition according to the above item 1, wherein the component (c) is an ammonium salt of tetrakis(pentafluorophenyl)boric acid.
3. The dual-curable adhesive composition according to the above item 1 or 2, further comprising (d) an inorganic filler.
4. The dual-curable adhesive composition according to any one of the above items 1 to 3, which is used for assembling a camera module.
5. A cured product obtained by curing the dual-curable adhesive composition according to any one of the above items 1 to 4.
6. A camera module comprising the cured product according to the above item 5.

Advantageous Effects of Invention

According to the present embodiment, it is possible to provide a dual-curable adhesive composition that is curable at a temperature as low as 120° C. or less without using an antimony compound and forms a cured product having excellent heat resistance.

DESCRIPTION OF EMBODIMENT

One aspect of the dual-curable adhesive composition of the present embodiment (hereinafter, also simply referred to as "composition" or "adhesive composition") comprises:

component (a1) an oxetane compound,
component (a2) an alicyclic epoxy compound,
component (a3) an aromatic glycidyl ether-based epoxy compound,
component (b) a photocationic polymerization initiator, and
component (c) a thermal cationic polymerization initiator comprising a tetrakis(pentafluorophenyl)borate compound, wherein
the amount of the component (a1) is 20 to 95 parts by mass,
the amount of the component (a2) is 3 to 55 parts by mass, and the amount of the component (a3) is 3 to 45 parts by mass, each based on 100 parts by mass of the total amount of the components (a1), (a2) and (a3).

The dual-curable adhesive composition of the present embodiment is thermally curable at a high reaction ratio at a low temperature (for example, 120° C. or lower, preferably 100° C. or lower, more preferably 90° C. or lower, and further preferably 80° C. or lower), and the cured product has a high glass transition temperature (Tg). Further, the dual-curable adhesive composition of the present embodiment has excellent safety because it is not necessary to use a highly toxic antimony-containing compound as the thermal cationic polymerization initiator.

Each component will now be described below.

Component (a1): Oxetane Compound

The oxetane compound (also simply referred to as component (a1)) is not particularly limited as long as it is a compound having an oxetane ring in the molecule. Preferably, the oxetane compound has a 3-oxetanyl group and, if necessary, may also have another functional group. The oxetane compound has at least one oxetane ring in the molecule, but preferably has two or more oxetane rings. The oxetane equivalent of the polyfunctional monomer having two or more oxetane groups is not particularly limited, but is preferably 400 or less, and more preferably 300 or less, and is preferably 100 or more.

The oxetane compound is not particularly limited, and examples thereof include bis[1-ethyl(3-oxetanyl)]methyl ether[(3-ethyl-3{[(3-ethyloxetane-3-yl)methoxy] methyl}oxetane)] represented by the following formula (a1-1), a xylylene bis oxetane represented by the following formula (a1-2), 4,4'-bis[3-ethyl-(3-oxetanyl)methoxymethyl]biphenyl, 3-ethyl-3-[(2-ethylhexyloxy)methyl]oxetane, 3-ethyl-3-hydroxymethyloxetane, 3-ethyl-3-(4-hydroxybutyl)oxymethyloxetane, 1,4-bis(3-ethyl-3-oxetanylmethoxy)methylbenzene, (3-ethyloxetane-3-yl) methyl methacrylate, (bis[(3-ethyl-3-oxetanyl)methyl] isophthalate), and the like.

The oxetane compounds may be used singly or in combinations of two or more thereof.

In one aspect of the present embodiment, it is preferable to comprise 3-ethyl-3{[(3-ethyloxetane-3-yl)methoxy] methyl}oxetane represented by the following formula (a1-1) as the component (a1). The amount of the compound represented by formula (a1-1) is preferably 80% by mass or more, and may be 100% by mass, based on the total amount of the component (a1).

(a1-1)

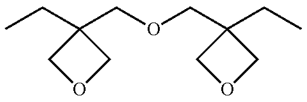

(a1-2)

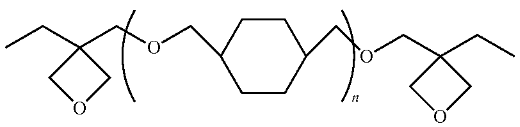

n = 1~3

Examples of commercially available products of the compound represented by formula (a1-1) include OXT-221 (trade name, manufactured by Toagosei Co., Ltd.). In addition, examples of commercially available products of the oxetane compound include OXT-212, OXT-101, and OXT-121 manufactured by Toagosei Co., Ltd., and EHO, OXMA, OXBP, HBOX, and OXIPA manufactured by Ube Industries, Ltd.

Since the composition comprises the component (a1), the rate of photocationic polymerization is improved and the reaction ratio of thermal cationic polymerization is improved. In the present specification, the reaction ratio of thermal cationic polymerization can be calculated by the method described in the Examples described later.

In the dual-curable adhesive composition of the present embodiment, the amount of the component (a1) is preferably 20 parts by mass or more, more preferably 25 parts by mass or more, further preferably 30 parts by mass or more, and still more preferably 35 parts by mass or more, regarding the lower limit, and is preferably 95 parts by mass or less, more preferably 90 parts by mass or less, further preferably 80 parts by mass or less, and still more preferably 60 parts by mass or less, regarding the upper limit, each based on 100 parts by mass of the total amount of the components (a1), (a2) and (a3).

If the amount of the component (a1) is too small, the photocationic curability may decrease. If the amount of the component (a1) is too large, the adhesive strength of the adhesive may decrease, or there may be safety concerns in irradiation with light such as UV due to too large heat of self-reaction of the adhesive.

Component (a2): Alicyclic Epoxy Compound

The alicyclic epoxy compound (also referred to as component (a2)) is not particularly limited as long as it is a compound having an alicyclic epoxy group in the molecule. The alicyclic epoxy group may be either a group in which an oxygen atom is bonded to two adjacent carbon atoms constituting a cyclic aliphatic skeleton, or a group in which an oxygen atom is bonded to two non-adjacent carbon atoms constituting a cyclic aliphatic skeleton. In view of reactivity and storage stability, it is preferable to use an alicyclic epoxy group in which an oxygen atom is bonded to two adjacent carbon atoms. The number of carbon atoms in the cyclic aliphatic skeleton is not particularly limited. The cyclic aliphatic skeleton is, for example, preferably a 5-membered ring to an 8-membered ring, more preferably a 5-membered ring or a 6-membered ring, and further preferably a 6-membered ring.

The number of alicyclic epoxy groups in the alicyclic epoxy compound is not particularly limited. For example, the number of alicyclic epoxy groups is preferably 2 to 6 in view of heat resistance and flexibility after curing of the composition, and more preferably is 2 to 4 in view of reducing the viscosity of the composition.

When the number of alicyclic epoxy groups in the alicyclic epoxy compound is two or more, the alicyclic epoxy groups may be bonded via a single bond or may be bonded via a linking group. The kind of linking group for binding the alicyclic epoxy groups to each other is not particularly limited. Examples of the linking group include a divalent hydrocarbon group, a carbonyl group (—CO—), an ether bond (—O—), an ester bond (—COO—), a carbonate bond (—OCOO—), and a combination of these groups. Examples of the divalent hydrocarbon group include a linear or branched alkylene group having 1 to 18 carbon atoms (preferably 1 to 6 carbon atoms) and a divalent alicyclic hydrocarbon group (particularly a divalent cycloalkylene group). Examples of the linear or branched alkylene group include a methylene group, a methylmethylene group, a dimethylmethylene group, an ethylene group, a propylene group, and a trimethylene group. Examples of the divalent alicyclic hydrocarbon group include a divalent cycloalkylene group (including a cycloalkylidene group) such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

As one aspect of the present embodiment, the alicyclic epoxy compound may have an epoxy group having ring strain, such as a cyclohexene oxide structure and a cyclopentene oxide structure, in the molecule. In particular, the alicyclic epoxy compound preferably has two or more of such epoxy groups in one molecule.

Examples of alicyclic epoxy compound include compounds represented by the following formulas (1) to (5), 8-caprolactone-modified 3',4'-epoxycyclohexylmethyl (3,4-epoxy)cyclohexanecarboxylate, 1,2-epoxy-4-vinylcyclohexane and epoxy-modified organosiloxane.

(1)

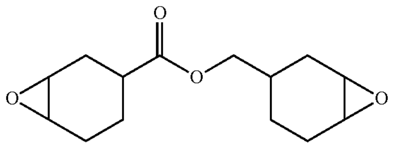

(2)

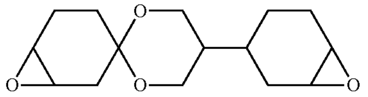

(3)

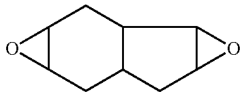

(4)

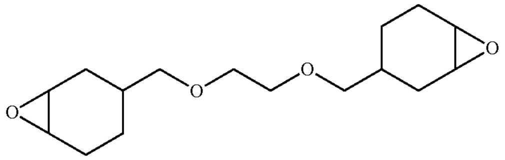

(5)

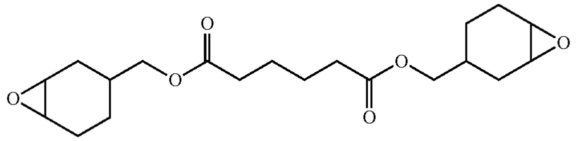

These alicyclic epoxy compounds may be used singly or in combinations of two or more thereof.

In one aspect of the present embodiment, the component (a2) preferably includes 3',4'-epoxycyclohexylmethyl 3,4-epoxycyclohexanecarboxylate represented by the above formula (1). The amount of the compound represented by formula (1) is preferably 80% by mass or more, and may be 100% by mass, based on the total amount of the component (a2).

Examples of commercially available products of the compound represented by formula (1) include Celloxide 2021 P (trade name, manufactured by Daicel Corporation). In addition, examples of commercially available alicyclic epoxy compounds include Celloxide 2081, Celloxide 2000, and Celloxide 8010 manufactured by Daicel Corporation, and KR470 manufactured by Shin-Etsu Chemical Co., Ltd.

Since the composition comprises the component (a2), Tg of the cured product thereof can be improved.

In the dual-curable adhesive composition of the present embodiment, the amount of the component (a2) is preferably 3 parts by mass or more, more preferably 5 parts by mass or more, further preferably 10 parts by mass or more, and still more preferably 20 parts by mass or more, regarding the lower limit, and is preferably 55 parts by mass or less, more preferably 50 parts by mass or less, and further preferably 45 parts by mass or less, regarding the upper limit, each based on 100 parts by mass of the total amount of the components (a1), (a2) and (a3).

If the amount of the component (a2) is too small, the Tg of the cured product thereof may decrease to deteriorate the heat resistance. If the content of the component (a2) is too large, the low temperature curability may deteriorate.

Component (a3): Aromatic Glycidyl Ether-Based Epoxy Compound

The aromatic glycidyl ether-based epoxy compound (also referred to as component (a3)) is not particularly limited as long as it is a compound having an aromatic hydrocarbon structure and a glycidyl ether group in the molecule. Preferably, the aromatic glycidyl ether-based epoxy compound has two or more aromatic hydrocarbon structures and two or more glycidyl ether groups in the molecule.

Examples of the component (a3) include a bisphenol type epoxy compound such as a bisphenol A type epoxy compound, a bisphenol F type epoxy compound, and a bisphenol S type epoxy compound; a novolac type epoxy compound such as a phenol novolac type epoxy compound and a cresol novolac type epoxy compound; and a biphenyl type epoxy compound.

The component (a3) preferably includes a bisphenol type epoxy compound, preferably includes at least one selected from a bisphenol A type epoxy compound and a bisphenol F type epoxy compound, and preferably includes at least a bisphenol A type epoxy compound. In general, the bisphenol A type epoxy compound and the bisphenol F type epoxy compound are produced by a reaction of epichlorohydrin with bisphenol A and bisphenol F, respectively. As one aspect of the present embodiment, the amount of the bisphenol A type epoxy compound and/or the bisphenol F type epoxy compound is preferably 80% by mass or more, and may be 100% by mass, based on the total amount of the component (a3).

The aromatic glycidyl ether-based epoxy compounds may be used singly or in combinations of two or more thereof.

The component (a3) is preferably a liquid or a semi-solid at ordinary temperature (about 23° C.), but a solid compound may be used after dissolving it. The epoxy equivalent of the component (a3) is not particularly limited, but is preferably 50 to 480, more preferably 60 to 450, for example.

Examples of commercially available aromatic glycidyl ether-based epoxy compounds include Bisphenol A type epoxy compounds such as 840, 840S, 850, 850S, EXA-850CRP, 850LC, 860, 1050, and 1055 manufactured by DIC Corporation; Bisphenol F type epoxy compounds such as 830, 830S, 835, EXA830CRP, EXA830LVP, and EXA835LV manufactured by DIC Corporation; Bisphenol A type epoxy compounds such as 825, 827, 828, 1001, 1002 manufactured by Mitsubishi Chemical Corporation; Bisphenol F type epoxy compounds such as 806, 806H, and 807 manufactured by Mitsubishi Chemical Corporation; Bisphenol A type epoxy compounds such as RE-310S manufactured by Nippon Kayaku Co., Ltd.; Bisphenol F type epoxy compounds such as RE-303S-L manufactured by Nippon Kayaku Co., Ltd.; and NC-3000L and NC-2000L manufactured by Nippon Kayaku Co., Ltd.

The component (a3) can impart adhesive strength to the dual-curable adhesive composition.

In the dual-curable adhesive composition of the present embodiment, the amount of the component (a3) is preferably 3 parts by mass or more, more preferably 5 parts by mass or more, further preferably 10 parts by mass or more, and still more preferably 15 parts by mass or more, regarding to the lower limit, and is preferably 45 parts by mass or less, more preferably 40 parts by mass or less, further preferably 35 parts by mass or less, and still more preferably 30 parts by mass or less, regarding the upper limit, each based on 100 parts by mass of the total amount of the components (a1), (a2) and (a3).

If the amount of the component (a3) is too small, the adhesive strength may decrease. If the amount of the component (a3) is too large, the low temperature curability may deteriorate.

Since the dual-curable adhesive composition of the present embodiment comprises the components (a1), (a2) and (a3) in the above-described predetermined ranges, the dual-curable adhesive composition has excellent adhesive strength, is curable at a high reaction ratio at a low temperature, and can form a cured product having a high heat resistance.

In the dual-curable adhesive composition of the present embodiment, the mass ratio of component (a1): component (a2): component (a3) is preferably 20 to 95:3 to 55:3 to 45, more preferably 25 to 70:5 to 50:5 to 35, and further preferably 30 to 60:7 to 45:5 to 27, for example.

The total amount of the components (a1), (a2) and (a3) is preferably 30% by mass or more and more preferably 40% by mass or more, and preferably 80% by mass or less and more preferably 70% by mass or less, based on 100% by mass of the total mass of the composition.

Component (b): Photocationic Polymerization Initiator

The photocationic polymerization initiator is a salt represented by $A^+B^-$ that generates a cationically active species when irradiated with light (preferably ultraviolet light). Here, the cation $A^+$ is preferably an aromatic iodonium ion or an aromatic sulfonium ion, for example. The aromatic iodonium ion is represented by the following formula:

$$Ar^1—I^+—Ar^2$$

In this formula, it is preferable that the groups $Ar^1$ and $Ar^2$ bonded to $I^+$ be both independently aromatic group, and particularly optionally substituted phenyl groups.

The aromatic sulfonium ion is represented by the following formula.

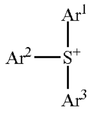

In this formula, it is preferable that $Ar^1$, $Ar^2$, and $Ar^3$ bonded to the center $S^+$ be each independently aryl group, and particularly optionally substituted phenyl group. Examples of the substituent include an alkyl group, a hydroxy group, a carboxyl group, an alkoxy group, an aryloxy group, an alkylcarbonyl group, an arylcarbonyl group, an aralkylcarbonyl group, an alkoxycarbonyl group, an aryloxycarbonyl group, an aralkyloxycarbonyl group, an alkylcarbonyloxy group, an arylcarbonyloxy group, an aralkylcarbonyloxy group, an alkoxycarbonyloxy group, an aryloxycarbonyloxy group, an aralkyloxycarbonyloxy group, an arylthiocarbonyl group, an arylthio group, an alkylthio group, an aryl group, a heterocyclic hydrocarbon group, an alkyl sulfinyl group, an aryl sulfinyl group, an alkylsulfonyl group, an arylsulfonyl group, and a hydroxy (poly)alkyleneoxy group.

In one aspect of the present embodiment, an initiator in which the anion $B^-$ is a $B(aryl)_4^-$ ion, such as $B(C_6F_5)_4^-$, may be included. Examples of the $B(aryl)_4^-$ include $B(C_6F_{40}CF_3)_4^-$ and $B(C_6F_4CF_3)_4^-$, in addition to $B(C_6F_5)_4^-$. Initiators in which the anion $B^-$ is a $B(aryl)_4^-$ ion tend to bring about a high curing rate.

In order to further improve the adhesiveness, an initiator in which the anion $B^-$ is an anion other than the $B(aryl)_4^-$ ion may be included. Examples of the anion $B^-$ include $PF_6^-$, $[(Rf)_bPF_{6-b}]^-$ (Rf represents alkyl group in which 80% or more of the hydrogen atoms are replaced with fluorine atoms, b represents the number thereof and is an integer of 1 to 5, and each Rf may be the same or different), $AsF_6^-$, and $BF_4^-$.

Examples of the photocationic polymerization initiator include (4-hydroxyphenyl)methylbenzylsulfonium tetrakis (pentafluorophenyl)borate, 4-(4-biphenylylthio)phenyl-4-biphenylylphenylsulfonium tetrakis(pentafluorophenyl)borate, 4-(phenylthio)phenyldiphenylsulfonium phenyltris (pentafluorophenyl)borate, [4-(4-biphenylylthio)phenyl]-4-biphenylylphenylsulfonium phenyltris(pentafluorophenyl) borate, diphenyl[4-(phenylthio)phenyl]sulfonium tris (pentafluoroethyl)trifluorophosphate, diphenyl[4-(phenylthio)phenyl]sulfonium tetrakis(pentafluorophenyl) borate, diphenyl[4-(phenylthio)phenyl]sulfonium hexafluorophosphate, 4-(4-biphenylylthio)phenyl-4-biphenylylphenylsulfonium tris(pentafluoroethyl)trifluorophosphate, bis[4-(diphenylsulfonio)phenyl]sulfide phenyltris (pentafluorophenyl)borate, [4-(2-thioxanthonylthio)phenyl] phenyl-2-thioxanthonylsulfonium phenyltris (pentafluorophenyl)borate, and compounds represented by the following formulas.

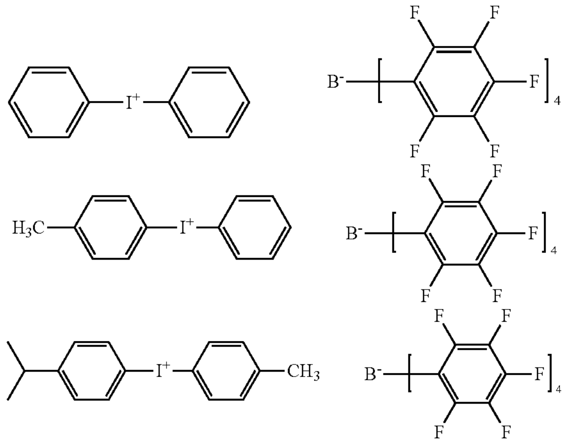

Examples of commercially available products that may be used as the photocationic polymerization initiator include CPI-100P, CPI-101A, CPI-200K, CPI-210S, CPI-310B, CPI-310FG, CPI-410S and IK-1 manufactured by San-Apro Ltd.; Irgacure 250 and Irgacure 270 manufactured by Ciba Specialty Chemicals Inc.; and BLUESIL PI 2074 manufactured by Elkem.

These photocationic polymerization initiators may be used singly or in combinations of two or more thereof.

The amount of the photocationic polymerization initiator is not particularly limited, but it is preferably 0.1 parts by mass or more, and more preferably 0.5 parts by mass or more, regarding the lower limit, and is preferably 10 parts by mass or less, and more preferably 5 parts by mass or less, regarding the upper limit, each based on 100 parts by mass of the total amount of the components (a1), (a2) and (a3).

In view of reducing toxicity, it is preferable that the amount of an antimony-containing compound be low in the photocationic polymerization initiator. The amount of an antimony-containing compound is preferably 3% by mass or less, more preferably 1% by mass or less, and further preferably 0% by mass, based on the total mass of 100% by mass of the photocationic polymerization initiator.

Component (c): Thermal Cationic Polymerization Initiator

The thermal cationic polymerization initiator is a compound that generates cationically active species by heat and cannot generate a practical amount of a cationically active species by light irradiation. The thermal cationic polymerization initiator is also a salt represented by $A^+B^-$. In the present embodiment, the temperature at which the cationically active species is generated is low, and it is preferably 60° C. or higher, and more preferably 70° C. or higher, regarding the lower limit, and is preferably 120° C. or lower, more preferably 100° C. or lower, further preferably 90° C. or lower, and still more preferably 80° C. or lower, regarding the upper limit.

In the present embodiment, the thermal cationic polymerization initiator preferably includes a compound in which the anion $B^-$ is an anion species represented by the following formula (c-1), that is, a tetrakis(pentafluorophenyl)borate compound.

(c-1)

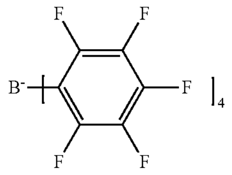

The cation species $A^+$ of the tetrakis(pentafluorophenyl) borate compound is preferably an ammonium cation represented by the following formula (c-2).

(c-2)

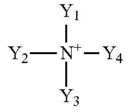

In the above formula (c-2), $Y_1$, $Y_2$, $Y_3$, and $Y_4$ each independently represent a hydrogen atom, linear, branched-chain, or cyclic alkyl group having 1 to 20 carbon atoms, or aryl group. It is preferable that at least one of $Y_1$, $Y_2$, $Y_3$, and $Y_4$ be aryl group.

In formula (c-2), the alkyl group has 1 to 20 carbon atoms, and preferably 1 to 15 carbon atoms. Examples of the alkyl group include a methyl group, an ethyl group, an n-propyl group, an isopropyl group, an n-butyl group, a sec-butyl group, and a cyclohexyl group. Further, examples of the aryl group include a phenyl group.

The alkyl group or aryl group may have a substituent. Examples of the substituent that the alkyl group may have include a phenyl group, an alkoxy group having 1 to 15 carbon atoms, and a hydroxy group. When the alkyl group has a substituent, the number of carbon atoms of the substituent is not included in the number of carbon atoms of the alkyl group. Examples of the substituent that the aryl group may have include an alkyl group having 1 to 15 carbon atoms, a hydroxyalkyl group having 1 to 15 carbon atoms, and an alkoxy group having 1 to 15 carbon atoms (preferably an alkoxy group having 1 to 8 carbon atoms, and more preferably a methoxy group and an ethoxy group), and a phenylthio group.

In one aspect of the present embodiment, it is preferable that the $A^+$ of the thermal cationic polymerization initiator $A^+B^-$ be a quaternary ammonium cation. It is preferable that in the above formula (c-2), $Y_1$, $Y_2$, $Y_3$, and $Y_4$ be each independently linear, branched-chain, or cyclic alkyl group having 1 to 20 carbon atoms, or aryl group. It is more preferable that two of $Y_1$, $Y_2$, $Y_3$, and $Y_4$ be each independently optionally substituted aryl group, and at the same time that the remaining two be each independently optionally substituted alkyl group having 1 to 15 carbon atoms (preferably alkyl group having 1 to 8 carbon atoms, and more preferably alkyl group having 1 to 3 carbon atoms).

Examples of the thermal cationic polymerization initiator include dimethylphenyl(4-methoxybenzyl)ammonium tetrakis(pentafluorophenyl)borate, dimethylphenyl(4-methylbenzyl)ammonium hexafluorotetrakis(pentafluorophenyl) borate, methylphenyldibenzylammonium tetrakis (pentafluorophenyl)borate, phenyltribenzylammonium tetrakis(pentafluorophenyl)borate, and dimethylphenyl(3,4-dimethylbenzyl)ammonium tetrakis(pentafluorophenyl)borate. Among these, dimethylphenyl(4-methoxybenzyl)ammonium tetrakis(pentafluorophenyl)borate is preferable. Examples of commercially available products include CXC1821 (trade name, manufactured by King Industries, Inc.).

These thermal cationic polymerization initiators may be used singly or in combinations of two or more thereof.

As another aspect of the tetrakis(pentafluorophenyl)borate compound as the thermal cationic polymerization initiator, the cation $A^+$ may be a sulfonium ion in which at least one of the three groups bonded to the S is alkyl group. In this case, two of the groups may together form an alkylene group to form a ring along with the S. The remaining group is preferably an optionally substituted aryl, alkyl or alkenyl group optionally substituted with aryl, or the like.

Specifically, it is represented by the following formula (c-3):

(c-3)

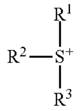

wherein at least one of the $R^1$, $R^2$, and $R^3$ bonded to the $S^+$ is alkyl group.

A preferable cation $A^+$ represents a cation in which, in formula (c-3), $R^1$ is optionally substituted phenyl group or naphthyl group, $R^2$ is alkyl group having 1 to 8 carbon atoms, and $R^3$ is optionally substituted phenyl group or naphthyl group, optionally substituted alkyl group, cycloalkyl group, optionally substituted alkenyl group, or 2-indanyl group.

Specifically, $R^1$ is optionally substituted phenyl group or naphthyl group, and may have, as a substituent, alkyl group having about 1 to 18 carbon atoms such as methyl, ethyl, propyl, isopropyl, butyl, isobutyl, t-butyl, pentyl, and hexyl, alkoxy group having about 1 to 18 carbon atoms such as methoxy, ethoxy, propoxy, butoxy, hexyloxy, decyloxy, and dodecyloxy, carbonyl group such as acetoxy, propionyloxy, decylcarbonyloxy, dodecylcarbonyloxy, methoxycarbonyl, ethoxycarbonyl, and benzoyloxy, phenylthio group, a halogen atom such as fluorine, chlorine, bromine, and iodine, cyano group, nitro group, and hydroxy group.

$R^2$ is alkyl group having 1 to 8 carbon atoms such as methyl, ethyl, propyl, isopropyl, butyl, isobutyl, pentyl, and hexyl.

When $R^3$ is optionally substituted phenyl group or naphthyl group, examples of the substituent include an alkyl group having about 1 to 18 carbon atoms such as methyl, ethyl, propyl, isopropyl, butyl, isobutyl, t-butyl, pentyl, and hexyl, an alkoxy group having about 1 to 18 carbon atoms such as methoxy, ethoxy, propoxy, butoxy, hexyloxy, decyloxy, and dodecyloxy, a carbonyl group such as acetoxy, propionyloxy, decylcarbonyloxy, dodecylcarbonyloxy, methoxycarbonyl, ethoxycarbonyl, and benzoyloxy, a phenylthio group, a halogen atom such as fluorine, chlorine, bromine, and iodine, a cyano group, a nitro group, and a hydroxy group.

When $R^3$ is optionally substituted alkyl group, the alkyl chain preferably has 1 to 18 carbon atoms, more preferably 1 to 12 carbon atoms, and most preferably 1 to 6 carbon atoms. Examples of the substituent include an alkoxy group such as methoxy, ethoxy, propoxy, butoxy, hexyloxy, decyloxy, and dodecyloxy, a carbonyl group such as acetoxy, propionyloxy, decylcarbonyloxy, dodecylcarbonyloxy, methoxycarbonyl, ethoxycarbonyl, and benzoyloxy, a phenylthio group, a halogen atom such as fluorine, chlorine, bromine, and iodine, a cyano group, a nitro group, a hydroxy group, and a phenyl group.

When $R^3$ is cycloalkyl group, the cycloalkyl group preferably has 3 to 12 carbon atoms. Examples of the cycloalkyl group include a cyclohexyl group, a cyclohexanonyl group, a cyclopentyl group, a 1-acenaphthenyl group, a bicyclononyl group, a norbornyl group, a coumarinyl group, a dihydrobenzofranyl group, and a camphor group.

When $R^3$ is optionally substituted alkenyl group, the alkenyl chain preferably has 1 to 18 carbon atoms, more preferably 1 to 12 carbon atoms, and most preferably 1 to 6 carbon atoms. Examples of the substituent include an alkoxy group such as methoxy, ethoxy, propoxy, butoxy, hexyloxy, decyloxy, and dodecyloxy, a carbonyl group such as acetoxy, propionyloxy, decylcarbonyloxy, dodecylcarbonyloxy, methoxycarbonyl, ethoxycarbonyl, and benzoyloxy, a phenylthio group, a halogen atom such as fluorine, chlorine, bromine, and iodine, a cyano group, a nitro group, a hydroxy group, and a phenyl group. In particular, a 2-alkene-1-yl type alkenyl is preferable.

Examples of commercially available thermal cationic polymerization initiators having a cation represented by formula (c-3) include SUN-AID SI series (SI-B2A, SI-B7, SI-B3A, SI-B3, SI-B5, SI-B4) manufactured by Sanshin Chemical Industry Co., Ltd.

Other examples of a preferable cation $A^+$ include compounds represented by the following formula (c-4):

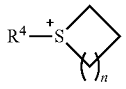

(c-4)

In the formula, n is 1 to 3, and most preferably is 2. $R^4$ represents optionally substituted phenyl or naphthyl group, optionally substituted alkyl group, cycloalkyl group, optionally substituted alkenyl group, or 2-indanyl group. Specifically, examples of $R^4$ include the groups mentioned as examples of $R^3$ in formula (c-3).

The thermal cationic polymerization initiator may include an thermal cationic polymerization initiator other than a tetrakis(pentafluorophenyl)borate compound as long as the effects of the present invention can be exhibited. Examples of the anion $B^-$ of the other thermal cationic polymerization initiator include a $PF_6^-$, $AsF_6^-$, $BF_4^-$, and $B(aryl)_4^-$ ion (excluding tetrakis(pentafluorophenyl)borate ion). Examples of the cation species $A^+$ include the cation species represented by the above formulas (c-2), (c-3), and (c-4).

Conventionally, antimony-containing compounds have been used as thermal cationic polymerization initiators in order to achieve low-temperature curing at 120° C. or lower, but there is a problem in that antimony-containing compounds are highly toxic and difficult to handle. However, the dual-curable adhesive composition of the present embodiment has low toxicity and excellent safety because it is curable at a low temperature substantially without including an antimony-containing compound as a thermal cationic polymerization initiator.

The amount of the tetrakis(pentafluorophenyl)borate compound is preferably 80% by mass or more, more preferably 90% by mass or more, and further preferably 100% by mass, based on 100% by mass of the total mass of the thermal cationic polymerization initiator of the present embodiment. It is particularly preferable that the tetrakis(pentafluorophenyl)borate compound be a quaternary ammonium salt. In the present embodiment, the amount of the antimony-containing compound is preferably as low as possible in view of reducing toxicity, and hence is preferably 3% by mass or less, more preferably 1% by mass or less, and further preferably 0% by mass, based on the total mass of 100% by mass of the thermal cationic polymerization initiator.

The amount of the thermal cationic polymerization initiator is not particularly limited, but it is preferably 0.01 parts by mass or more, and more preferably 0.1 parts by mass or more, regarding the lower limit, and is preferably 10 parts by mass or less, more preferably 5 parts by mass or less, and further preferably 3 parts by mass or less, regarding the upper limit, each based on 100 parts by mass of the total amount of the components (a1), (a2) and (a3).

Component (d): Inorganic Filler

One aspect of the dual-curable adhesive composition of the present embodiment may comprise an inorganic filler (also referred to as component (d)) in addition to the above-described components (a1) to (c), whereby the coefficient of linear expansion of the dual-curable adhesive composition can be controlled. Examples of the inorganic filler (d) include silica fillers such as colloidal silica, hydrophobic silica, fine silica and nanosilica, acrylic beads, glass beads, urethane beads, bentonite, acetylene black, and Ketjen black. In some cases, it may be preferable that the dual-curable adhesive composition of the present embodiment not include a basic filler because a basic filler may react with the cations generated from the polymerization initiator.

The average particle size of the component (d) (if it is not granular, the average maximum diameter) is not particularly limited, but is preferably 0.01 μm or more because in such a case the dual-curable adhesive composition is excellent in handling. Further, the average particle size of the inorganic filler (d) (if it is not granular, the average maximum diameter) is preferably 50 μm or less because in such a case the component (d) is uniformly dispersed in the dual-curable adhesive composition. In the present invention, the average particle size of the inorganic filler is measured by a dynamic light scattering nanotrack particle size analyzer.

Examples of commercially available products of the component (d) include high-purity synthetic spherical silica (trade name "SO-E5", manufactured by Admatechs Company Ltd., average particle size: 2 μm; trade name "SO-E2", manufactured by Admatechs Company Ltd., average particle size: 0.6 μm), silica (trade name "FB7SDX", manufactured by Tatsumori, average particle size: 10 μm), and silica (trade name "TS-10-034P", manufactured by Micron, average particle size: 20 μm).

These may be used as the component (d) singly or in combinations of two or more thereof.

The amount of the component (d) is not particularly limited, but it is preferably 10 parts by mass or more, more preferably 30 parts by mass or more, and further preferably 70 parts by mass or more, regarding the lower limit, and is preferably 200 parts by mass or less, more preferably 180 parts by mass or less, and further preferably 150 parts by mass or less, regarding the upper limit, each based on 100 parts by mass of the total amount of the components (a1), (a2) and (a3).

Component (e): Other Components

One aspect of the dual-curable adhesive composition of the present embodiment may further include other components. Examples of other components include a thixo-imparting agent such as fumed silica, and various coupling agents such as silane and titanate.

When a thixo-imparting agent such as fumed silica is included in the composition, stringing and spreading can be suppressed in application of the composition. Examples of commercially available fumed silica include Cab-O-Sil TS-720 and TS-530 manufactured by Cabot Corporation, and Aerosil R974 manufactured by Nippon Aerosil Co., Ltd.

The silane coupling agent may have a vinyl group, an epoxy group, a styryl group, an acryloyl group, a methacryloyl group, an amino group, a ureido group, an isocyanate group, an isocyanurate group, a mercapto group, and the like. The silane coupling agent is not particularly limited, and examples thereof may include γ-aminopropyltriethoxysilane, γ-mercaptopropyltrimethoxysilane, γ-methacryloxypropyltrimethoxysilane, and γ-glycidoxypropyltrimethoxysilane. Examples of commercially available products include KBM-303, 402, 403 and KBE-402, 403 manufactured by Shin-Etsu Chemical Co., Ltd.

When the composition comprises fumed silica, the amount thereof is not particularly limited, but the amount is preferably 1 to 15 parts by mass, and more preferably 1 to 7 parts by mass, based on 100 parts by mass of the total amount of the components (a1), (a2) and (a3). When the composition comprises a silane coupling agent, the amount thereof is not particularly limited, but the amount is 0.1 to 8 parts by mass, and more preferably 0.2 to 5 parts by mass, based on 100 parts by mass of the total amount of the components (a1), (a2) and (a3).

The composition of the present embodiment may further comprise, as necessary, a colorant, a surfactant, a storage stabilizer, a plasticizer, a lubricant, an antifoaming agent, a leveling agent, a photosensitizer such as thioxanthone, and the like.

Further, the composition may comprise a diluent for an epoxy compound. The diluent may be a known compound, and examples thereof include vinyl ethers and polyols. Examples of vinyl ethers include mono- or polyfunctional vinyl ethers, such as cyclohexanedimethanol divinyl ether, triethyleneglycol divinyl ether, and hydroxybutyl vinyl ether. In addition to a function as a diluent, polyols also have a function for improving the adhesiveness in the resin system of the present invention. Examples thereof include an alkyl polyol, a polyester polyol, a polyether polyol, an acrylic polyol, a polybutadiene polyol, and a phenolic polyol. Among these, an alkyl polyol, a polyester polyol, and a polyether polyol are preferable, and a polyether polyol is particularly preferable.

The dual-curable adhesive composition of the present embodiment is thermally curable at a high reaction ratio at a low temperature, and the cured product has a high glass transition temperature. For example, the composition preferably has a reaction ratio (see Examples for the calculation method) at 80° C. of 83% or more, and the cured product after photo-curing and thermally curing preferably has a Tg of 85° C. or higher. The upper limit of the Tg of the cured product is not particularly limited, but the Tg is, for example, 150° C. or lower.

The viscosity of the composition is not particularly limited, and the composition is preferably in the form of a paste at ordinary temperature (about 25° C.). The viscosity of the composition is preferably 10 Pa-s to 100 Pa-s at 25° C. and more preferably 20 Pa-s to 80 Pa-s in view of dischargeability, for example. The viscosity of the composition at 25° C. is measured using an E-type viscometer (cone angle 1.565°, rotation speed 5 rotations/minute).

Preparation Method of Dual-Curable Adhesive Composition

The dual-curable adhesive composition may be prepared by any method as long as the various components described above can be dispersed and mixed. In a general method, the dual-curable adhesive composition can be obtained by weighing the components, mixing and kneading them using a mixer, a mixing roll (three-roll mill, etc.), a planetary mixer, or the like, and defoaming as necessary.

Curing Method

The method of curing the dual-curable adhesive composition of the present embodiment preferably comprises a photocuring step of curing the composition by light irradiation and a thermally curing step of further curing the composition by heating. By curing by light irradiation and then further applying a heat treatment, the durability of the adhesiveness, the water resistance, and the like are improved.

In the photocuring step, the light for irradiation preferably includes light in the wavelength range of 300 nm to 500 nm, and more preferably includes ultraviolet light having a wavelength of 400 nm or less (preferably 380 to 20 nm). The light source is not particularly limited, and examples thereof include an ultraviolet LED, a blue LED, a white LED, a laser, a metal halide lamp, a xenon lamp, and a high-pressure or medium-pressure mercury lamp. The light irradiance is not particularly limited, but the intensity at a wavelength of 365 nm is preferably about 0.1 to 1000 $mW/cm^2$, and more preferably about 1 to 800 $mW/cm^2$. The light irradiation time is not particularly limited, but is, for example, 2 seconds to 5 minutes.

In the thermally curing step, the heating temperature is preferably 60° C. to 120° C., and more preferably 80° C. to 100° C. The heating time is not particularly limited, but is preferably 10 minutes to 4 hours, for example.

Applications

In one aspect of the present embodiment, the dual-curable adhesive composition can be used in various fields. In the field of optical equipment, the dual-curable adhesive composition may be used for an adhesive in camera modules, LiDAR modules (light detection and ranging, i.e., detection and distance measurement by light (including laser and infrared rays)), materials for still camera lenses, finder prisms, target prisms, finder covers, light receiving sensor units, photography lenses, projection lenses for projection televisions, and the like. The bonding sites in the camera module may be, for example, between an image sensor (image capturing sensor) such as CMOS or CCD and a base plate, between a cut filter and the base plate, between the base plate and a housing, between the housing and the cut filter, or between the housing and a lens unit. As for other fields, the dual-curable adhesive composition can be used, in the field of automobiles and transport equipment, for the bonding of automobile switch parts, electrical components, and the like; for flat panel displays, the sealing and bonding of liquid crystal displays, organic electroluminescent displays, light emitting diode display devices, field emission displays, and as an ink material; in the recording field, the bonding of video discs, CDs, DVDs, MDs, pickup lenses, hard disk peripherals (members for spindle motors, members for magnetic head actuators, etc.), Blu-ray discs, and the like; in the field of electronic materials, the bonding and coating of electronic component structures; in the field of optical components, for the sealing and bonding around optical switches, optical fiber materials around optical connectors, optical passive components, optical circuit components, around optical electron integrated circuits, in optical communication systems, and the like.

Examples of an adherend to which the dual-curable adhesive composition of the present embodiment may be used include glass, various metals, a porous member, and a resin film or plate. Examples of the various metals include aluminum, nickel, iron, and stainless steel. Examples of the porous member include ceramics. Examples of the resins used as a raw material for the resin film or plate include polycarbonate, PPS, PBT, PA, LCP, FR4, and FR5.

As a preferable aspect, the dual-curable adhesive composition of the present invention is used for assembling a camera module. More specifically, the dual-curable adhesive composition of the present invention is preferably used in a camera module assembly to bond a lens holder and the base plate on which the image capturing sensor is fixed. The camera module is not particularly limited, and may be, for example, a small camera module used for smartphones, in-vehicle cameras, and the like.

EXAMPLES

The present invention will now be described with reference to Examples for the purpose of describing the present invention in more detail and more specifically, but these Examples do not limit the present invention in any way.

In the Examples and Comparative Examples, the components blended in the dual-curable adhesive composition are shown below.

Component (a1): Oxetane Compound (a1-1) OXT-221 (trade name, manufactured by Toagosei Co., Ltd.)

Component (a2): Alicyclic Epoxy Compound (a2-1) Celloxide 2021P (trade name, manufactured by Daicel Corporation)

Component (a3): Aromatic Glycidyl Ether-Based Epoxy Compound (a3-1) EPICLON EXA-850CRP (trade name, manufactured by DIC Corporation)

Component (b): Photocationic Polymerization Initiator (b-1) CPI-200K (trade name, manufactured by San-Apro Ltd.)

Component (c): Thermal Cationic Polymerization Initiator (c-1) CXC1821 (trade name, manufactured by King Industries, Inc., dimethylphenyl(4-methoxybenzyl)ammonium tetrakis(pentafluorophenyl)borate)

(c'-2) CXC1612 (trade name, manufactured by King Industries, Inc., dimethylphenyl(4-methoxybenzyl)ammonium hexafluoroantimonate)

(c'-3) TA100 (trade name, manufactured by San-Apro Ltd., structural formula is represented by the following formula (c'-3))

(c'-3)

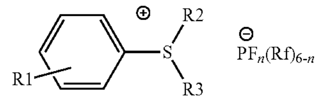

Component (d): Inorganic Filler (d-1) Spherical silica: SO-E5 (trade name, manufactured by Admatechs Company Ltd.)

Component (e): Other (e-1) Thixo-imparting agent: Cabo-Sil TS720 (trade name, manufactured by Cabot Corporation)

(e-2) Silane coupling agent: KBM403 (trade name, manufactured by Shin-Etsu Chemical Co., Ltd., 3-glycidoxypropyltrimethoxysilane)

Preparation of Composition

The components (a1-1) to (e-2) were blended in the ratios shown in Table 1, and then kneaded and dispersed using a three-roll mill to prepare the dual-curable adhesive compositions of the Examples and Comparative Examples.

The following evaluations were performed for each of the obtained dual-curable adhesive compositions. The results are shown in Table 1.

Photocurability 50 mg of each composition was placed on a glass plate, and irradiated with 365 nm-UV-LED (500 $mW/cm^2$) for 5 seconds using a UJ35 UV irradiator manufactured by Panasonic Corporation, and then the resulting compositions were pierced with a bamboo skewer and evaluated according to the following criteria.

The results are shown as UV curability in Table 1.

○: No adherence of the composition to the bamboo skewer was observed.

x: Adherence of the composition to the bamboo skewer was observed.

Reaction Ratio in Thermally Curing 10 mg of each composition was held in an oven at 80° C. for 1 hour to thermally cure. The heat capacity of each composition before and after curing was measured with a DSC 6220 (measurement temperature range 30 to 150° C., heating rate 5° C./min). From the obtained DSC curve, the cumulative heat capacity of the composition before curing and the residual cumulative heat capacity of the cured product after curing were calculated. Based on these cumulative heat capacity values, the reaction ratio was calculated from the following formula.

Reaction ratio (%)=100×(cumulative heat capacity of composition before curing−residual cumulative heat capacity of cured product)/cumulative heat capacity of composition before curing Glass Transition Temperature (Tq)

An adhesive composition was applied on a release film to a thickness of 2 mm, irradiated with 365 nm-UV-LED (500 mW/cm$^2$) for 5 seconds, and then cured at 80° C. for 1 hour in a hot air circulation oven. The thermal analysis of the obtained cured product was carried out using TMA (TMA/SS6100, thermomechanical analyzer) in a compression mode (load 49 mN), and Tg was measured at a heating rate of 5° C./min.

From the above results, it can be seen that when a tetrakis(pentafluorophenyl)borate compound is used as a thermal cationic polymerization initiator that does not include antimony, together with the components (a1), (a2) and (a3) within predetermined amounts blended, a dual-curable adhesive composition is obtained that has excellent low temperature curability and provides a cured product having a high Tg.

As is clear from the above, various changes can be made to the dual-curable adhesive composition without departing from the spirit of the present invention. Therefore, the embodiments described herein are illustrative examples, and do not limit the scope of the present invention described in the claims.

TABLE 1

| | Examples | | | | | | Comparative Examples | | | | | | | | | |
|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 10 |
| Component | | | | | | | | | | | | | | | | |
| a1-1 | 80 | 25 | 50 | 33 | 90 | 42.5 | 28 | 50 | 50 | 0 | 10 | 10 | 25 | 15 | 17.5 | 40 |
| a2-1 | 10 | 50 | 25 | 34 | 5 | 15 | 34 | 50 | 0 | 50 | 10 | 80 | 25 | 42.5 | 65 | 40 |
| a3-1 | 10 | 25 | 25 | 33 | 5 | 42.5 | 38 | 0 | 50 | 50 | 80 | 10 | 50 | 42.5 | 17.5 | 20 |
| b-1 | 2 | 2 | 2 | 2 | 2 | 2 | 2 | 2 | 2 | 2 | 2 | 2 | 2 | 2 | 2 | 2 |
| c-1 | 1 | 1 | 1 | 1 | 1 | 1 | 0 | 1 | 1 | 1 | 1 | 1 | 1 | 1 | 1 | 0 |
| c'-2 | 0 | 0 | 0 | 0 | 0 | 0 | 1 | 0 | 0 | 0 | 0 | 0 | 0 | 0 | 0 | 0 |
| c'-3 | 0 | 0 | 0 | 0 | 0 | 0 | 0 | 0 | 0 | 0 | 0 | 0 | 0 | 0 | 0 | 0.2 |
| d-1 | 100 | 100 | 100 | 100 | 100 | 100 | 100 | 100 | 100 | 100 | 100 | 100 | 100 | 100 | 100 | 100 |
| e-1 | 4 | 4 | 4 | 4 | 4 | 4 | 4 | 4 | 4 | 4 | 4 | 4 | 4 | 4 | 4 | 4 |
| e-2 | 1 | 1 | 1 | 1 | 1 | 1 | 1 | 1 | 1 | 1 | 1 | 1 | 1 | 1 | 1 | 1 |
| Evaluation | | | | | | | | | | | | | | | | |
| UV curability | ○ | ○ | ○ | ○ | ○ | ○ | ○ | ○ | ○ | x | x | x | ○ | ○ | ○ | ○ |
| Reaction ratio (%) | 93 | 84 | 90 | 91 | 95 | 85 | 91 | 82 | 73 | 70 | 66 | 79 | 81 | 80 | 82 | 80 |
| Tg (° C.) | 100 | 86 | 86 | 102 | 90 | 91 | 85 | 106 | 99 | 88 | 99 | 104 | 88 | 85 | 99 | 103 |

The unit of numerical value regarding the content in the table is "part(s) by mass".

Comparative Example 1 shows the results of a composition comprising a conventionally used antimony-containing compound (which is toxic) as the thermal cationic polymerization initiator. On the other hand, Examples 1 to 6 and Comparative Examples 2 to 9 show the results of compositions comprising a quaternary ammonium salt of tetrakis (pentafluorophenyl) boric acid, which has low toxicity, as the thermal cationic polymerization initiator. When the amounts of the components (a1), (a2) and (a3) blended were changed as shown in Table 1, Examples 1 to 6 all showed good results in UV curability, reaction ratio in curing at low temperature, and Tg of the cured product, and the physical properties obtained in Examples 1 to 6 were thus equal to or higher than those in Comparative Example 1 or not significantly inferior to those of Comparative Example 1. In Comparative Examples 4 to 6, sufficient UV curability was not obtained because the amount of oxetane compound (component (a1)) was small. In the blending ratios of Comparative Examples 1 to 3 and Comparative Examples 7 to 9, at least one of the reaction ratio at low temperature curing and Tg was significantly inferior. In Comparative Example 10, a compound represented by the formula (c'-3) was used as the thermal cationic polymerization initiator, but the reaction ratio at low temperature curing was lower than that of the Examples.

INDUSTRIAL APPLICABILITY

The present invention can provide a dual-curable adhesive composition suitable for the assembly of a camera module and the like.

What is claimed is:

1. A dual-curable adhesive composition comprising:
(a1) an oxetane compound,
(a2) an alicyclic epoxy compound,
(a3) an aromatic glycidyl ether-based epoxy compound,
(b) a photocationic polymerization initiator, and
(c) a thermal cationic polymerization initiator comprising a tetrakis(pentafluorophenyl) borate compound, wherein
the amount of the component (a1) is 30 to 60 parts by mass,
the amount of the component (a2) is 7 to 45 parts by mass, and
the amount of the component (a3) is 5 to 27 parts by mass, each based on 100 parts by mass of the total amount of the components (a1), (a2) and (a3).

2. The dual-curable adhesive composition according to claim 1, wherein the component (c) is an ammonium salt of tetrakis(pentafluorophenyl) boric acid.

3. The dual-curable adhesive composition according to claim 1, further comprising (d) an inorganic filler.

4. The dual-curable adhesive composition according to claim 1, which is used for assembling a camera module to bond a lens holder and a base plate on which an image capturing sensor is fixed.

5. A cured product obtained by curing the dual-curable adhesive composition according to claim 1.

6. A camera module comprising the cured product according to claim 5.

7. A dual-curable adhesive composition comprising:

(a1) 50 parts by mass of an oxetane compound, (a2) 25 parts by mass of an alicyclic epoxy compound, (a3) 25 parts by mass of an aromatic glycidyl ether-based epoxy compound, each based on 100 parts by mass of the total amount of the components (a1), (a2) and (a3), (b) a photocationic polymerization initiator, (c) a thermal cationic polymerization initiator comprising a tetrakis(pentafluorophenyl) borate compound, and (d) an inorganic filler comprising silica.

8. The dual curable adhesive composition according to claim 7, wherein the amount of the component (b) is 2 parts by mass, the amount of the component (c) is 1 part by mass, and the amount of component (d) is 100 parts by mass, each based on 100 parts by mass of the total amount of the components (a1), (a2) and (a3).

9. The dual curable adhesive composition according to claim 8, further comprising (e) 4 parts by mass of a thixo-imparting agent and 1 part by mass of a silane coupling agent, each based on 100 parts by mass of the total amount of the components (a1), (a2) and (a3).

* * * * *